United States Patent [19]

Mudge

[11] Patent Number: 4,812,547

[45] Date of Patent: Mar. 14, 1989

[54] PRESSURE SENSITIVE ADHESIVES COMPRISING ETHYLENE VINYL ACETATE DIOCTYL MALEATE TERPOLYMERS

[75] Inventor: Paul R. Mudge, Somerville, N.J.

[73] Assignee: National Starch & Chemical Corp., Bridgewater, N.J.

[21] Appl. No.: 807,888

[22] Filed: Dec. 11, 1985

[51] Int. Cl.$^4$ ............................................. C08F 26/02
[52] U.S. Cl. ................................... 526/301; 524/808; 524/809; 524/813; 524/820; 524/823; 526/261; 526/264; 526/303.1; 526/304; 526/307.7; 526/317.1; 526/318.4; 526/318.43; 526/320; 526/323.1; 526/324

[58] Field of Search ............ 526/261, 264, 301, 303.1, 526/304, 307.7, 318, 317.1, 318.4, 318.43, 320, 323.1, 324; 524/808, 809, 813, 820, 823

[56] References Cited

U.S. PATENT DOCUMENTS

| | | | |
|---|---|---|---|
| 2,480,551 | 5/1945 | Coffman et al. | 526/324 |
| 2,965,617 | 12/1960 | MacDonald | 526/318 |
| 3,268,357 | 8/1966 | Hart et al. | 117/122 |
| 3,483,171 | 12/1969 | Kühlkamp et al. | 526/318 |
| 3,485,896 | 12/1969 | Popa et al. | 260/901 |
| 3,491,070 | 1/1970 | Weaver | 260/80.73 |
| 3,501,440 | 3/1970 | Kamio et al. | 526/324 |
| 3,547,847 | 12/1970 | Levine et al. | 524/823 |
| 3,639,326 | 2/1972 | Kray et al. | 526/324 |
| 3,657,174 | 12/1967 | Glabisch et al. | 526/318 |
| 3,690,937 | 9/1972 | Guse et al. | 526/318 |
| 3,723,397 | 3/1973 | Hoh et al. | 526/318 |
| 3,755,237 | 8/1973 | Isaacs et al. | 526/324 |
| 3,817,896 | 6/1974 | Bergmeister et al. | 524/823 |
| 3,823,108 | 7/1974 | Bissot | 526/318 |
| 3,923,752 | 12/1975 | Güse et al. | 526/318 |
| 3,998,997 | 12/1976 | Mowdood et al. | 526/271 |
| 4,035,329 | 7/1977 | Wiest et al. | 524/823 |
| 4,048,411 | 9/1977 | Mietzner et al. | 526/324 |
| 4,073,779 | 2/1978 | Wiest et al. | 526/318 |
| 4,245,076 | 1/1981 | Marquardt | 526/318 |
| 4,273,145 | 6/1981 | Lester et al. | 264/316 |
| 4,299,941 | 11/1981 | Narisawa et al. | 526/324 |
| 4,322,516 | 3/1982 | Weist et al. | 526/307.7 |
| 4,507,429 | 3/1985 | Lenney | 524/800 |
| 4,547,428 | 10/1985 | Bekker et al. | 526/324 |

FOREIGN PATENT DOCUMENTS

| | | | |
|---|---|---|---|
| 0073235 | 6/1978 | Japan | 524/823 |
| 1123879 | 8/1968 | United Kingdom | 526/324 |
| 1188635 | 4/1970 | United Kingdom | 526/324 |

OTHER PUBLICATIONS

CA96(22)184028b; Chemical Abstract; Sanyo Chemical Industries, Ltd. Patent Application JP 56/167791 "Low-temperature Flow Improvers".

CA102(8):64744c; Chemical Abstract; Mitsubishi Electric Corp. Patent Application JP 59/138695 "Pour Point Depressants for Crude Petroleum".

Primary Examiner—Joseph L. Schofer
Assistant Examiner—J. M. Reddick
Attorney, Agent, or Firm—Edwin M. Szala

[57] ABSTRACT

Permanently tacky pressure sensitive adhesives comprise terpolymers consisting essentially of 35–50% by weight of a vinyl ester of an alkanoic acid, 15–30% by weight ethylene and 35–50% by weight of di-2-ethylhexyl maleate or di-n-octyl maleate or a corresponding fumerate.

3 Claims, No Drawings

PRESSURE SENSITIVE ADHESIVES COMPRISING ETHYLENE VINYL ACETATE DIOCTYL MALEATE TERPOLYMERS

BACKGROUND OF THE INVENTION

This invention relates to pressure sensitive adhesives compositions. More particularly, the invention relates to pressure sensitive adhesive compositions comprising terpolymers of ethylene, vinyl acetate and di-2-ethylhexyl maleate or di-n-octyl maleate or the corresponding fumarates.

Pressure-sensitive adhesives, especially those which are normally used in the form of adhesive tapes or veneers and wallpapers, have attained considerable industrial importance. Their function is to provide instantaneous adhesion when applied under light pressure, and most applications further require that they can be easily removed from the surface to which they have been applied by a light pull. They are characterized by having a built-in capacity to secure this instantaneous adhesion to a surface without activation, such as treatment with solvents or heat, and also by having sufficient internal strength so that the adhesive material will not rupture before the bond between the adhesive material and the surface ruptures. The capacity to obtain instantaneous adhesion is usually expressed as the amount of "tack" or "tackiness". Ordinarily it is desirable to obtain as much tack as possible without losing a sinificant amount of internal strength (cohesion). The latter balance of adhesive and cohesive properties has been difficult to obtain in adhesive polymers since monomers conventionally added to increase the cohesive strength generally result in a decrease in adhesive tack.

U.S. Pat. No. 4,322,516 issued Mar. 30, 1982 to Wiest et al. discloses copolymers for use as pressure sensitive adhesives comprising ethylene, acrylic esters, vinyl acetate and (meth) acrylamide. While providing some improvements over adhesives of the prior art, the latter compolymers are still deficient with respect to their balance of cohesive and adhesive properties, particularly when applied to hard to adhere surfaces such as the hydrophobic polyolefin substrates.

SUMMARY OF THE INVENTION

We have now found that permanently tacky pressure sensitive adhesives may be prepared from copolymers 35–50% by weight of a vinyl ester of an alkanoic acid, 15–30% by weight ethylene, and 35–50% by weight of di-2-ethylhexyl maleate or di-n-octyl maleate or a corresponding fumarate.

The resulting adhesives are characterized by an unexpected balance of adhesive (tack) and cohesion (shear strength) usually associated only with conventional low $T_g$ polyacrylates which contain very high levels of acrylate or with adhesives based on tackified styrene-butadiene rubbers. As such, the pressure sensitive adhesives find particular application for adhering strongly hydrophobic polymers to themselves and to other materials and especially for use as adhesive for permanent paper label and tape applications.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isooctanoate, vinyl nonate, vinyl decanoate, vinyl pivalate, vinyl versatate, etc. Of the foregoing, vinyl acetate is the preferred monomer because of its ready availability and low cost. The vinyl ester is present in the copolymer in amounts of about 35 to 50% by weight; preferably 40 to 45%.

The dioctyl maleate isomers utilized herein are the di-2-ethylhexyl maleates or di-n-octyl maleates with the di-2-ethylhexyl esters of maleic acid being preferred. Since, after polymerization, the structure of the fumarate and maleate (the cis and the isomers) are the same, the corresponding fumarate esters are also contemplated for use herein. The latter components are present in the copolymer in amounts of about 35 to 50% by weight, preferably 35 to 40%.

In addition to the 15 to 30% ethylene, it may also be desired to incorporate in the copolymer minor amounts of other functional comonomers. Suitable copolymerizable comonomers include, for example, monoethyl maleate, acrylamide, acrylic acid, allyl carbamate, N-methylol (methy)acrylamide, N-vinylpyrrolidinone, diallyl adipate, triallyl cyanurate, butanediol diacrylate, allyl methacrylate, hydroxyalkyl acrylate, etc. The latter comonomers are generally used at levels of less than about 3% depending upon the nature of the specific comonomer. In all cases, the $T_g$ of the resultant pressure sensitive adhesive should be within the range of about $-35°$ to $-25°$ C. so the optional comonomers should not be added at levels which will result in polymers outside this $T_g$ range.

In addition, certain copolymerizable monomers which assist in the stability of the copolymer emulsion, e.g., vinyl sulfonic acid, are also useful herein as latex stabilizers. These optionally present monomers, if employed, are added in very low amounts of from 0.1 to about 2% by weight of the monomer mixture.

Conventional batch, semi-batch or continuous emulsion polymerization procedures may be utilized herein. Generally, the monomers are polymerized in an aqueous medium under pressures not exceeding 100 atmospheres in the presence of a catalyst and at least one emulsifying agent.

The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitably employed. The mixture is thoroughly agitated to dissolve the ethylene, agitation being continued until substantial equilibrium is achieved. This generally requires about 15 minutes. However, less time may be required depending upon the vessel, the efficiency of agitation, the specific system, and the like.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The emulsifying agents are those generally used in emulsion polymerization, as well as optionally present protective colloids. It is also possible to use emulsifiers alone or in mixtures with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, as well as esters of sulfosuccinic acid, Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hyrophobic emulsifying agent in combination with a relatively hydrophilic agent. The amount of emulsifying agent is generally from aout 1 to about 10, preferably from about 2 to about 8, weight percent of the monomers used in the polymerization.

The emulsifier used in the polymerization can also be added, in its entirety, to the initial charge to the polymerization zone or a portion of the emulsifier, e.g. from 90 to 25 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The polymerization reaction is generally continued until the residual vinyl acetate, monomer content is below about 1%. The completed reaction product is then allowed to cool to about room temperature, while sealed from the atmosphere.

The adhesive emulsions are produced and used at relatively high solids contents, e.g. between 35 and 70%, preferably not less than 50%, although they may be diluted with water if desired.

The particle size of the latex can be regulated by the quantity of nonionic or anionic emulsifying agent or protective colloid employed. To obtain smaller particles sizes, greater amounts of emulsifying agents are used. As a general rule, the greater the amount of the emulsifying agent employed, the smaller the average particle size.

If desired, conventional additives may be incorporated into the novel adhesives of our invention in order to modify the properties thereof. Among these additives may be included thickeners, fillers or pigments, such as talc and clay, small amounts of tackifiers, etc.

The emulsion adhesive is useful on any conventional tape or other face stock including not only paper but also including those substrates made from cotton cloth, nonwoven scrim, printed plastic foils or films or metal or metallized foils. The adhesive may be applied using conventional techniques. Typical methods involve application of the adhesive onto a release liner by use of mechanical coating processes such as air knife, trailing blade, knife coater, reverse roll or gravure coating techniques. The adhesive is allowed to dry at room temperature and then oven dried at about 250° F. for 10 minutes. The coated release liner may then be laminated to the face stock by a nip roll using pressure between a rubber roll and a steel roll. This technique effects a transfer of the adhesive mass to the face stock with a minimum of penetration.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

EXAMPLE 1

This example illustrates the polymerization method used in preparing pressure sensitive adhesives of the present invention.

To a 10 liter autoclave was charged 675 g (of a 20% w/w solution in water) sodium alkyl aryl polyethylene oxide sulphate (3 moles ethylene oxide), 50 g (of a 70% w/w solution in water) alkyl aryl polyethylene oxide (30 moles ethylene oxide), 60 g (of a 25% w/w solution in water) sodium vinyl sulphonate, 0.5 g sodium acetate, 2 g sodium formaldehyde sulphoxylate, 5 g (of a 1% w/w solution in water) ferrous sulphate solution and 1900 g water. After purging with nitrogen, 1575 g vinyl acetate and 1425 g di-2-ethylhexyl maleate were charged to the reactor. The reactor was then pressurized to 750 psi with ethylene and equilibrated at 50° C. for 15 minutes. The polymerization was then started by metering in a solution of 60 g tertiary butyl hydroperoxide in 290 g water and 45 g sodium formaldehyde sulphoxylate and 2 g sodium acetate in 225 g water over a period of 5 hrs uniformly.

Once the addition of the initiators was started, the reaction temperature was raised to 80°-82° C. and kept at this temperature until the reaction was completed. At the end of the initiator slow additions, the product was transferred to an evacuated vessel (30 liter) to remove residual ethylene from the system. It was identified as Emulsion 1.

Using the general procedure described above, ten additional emulsions were prepared varying the amounts and/or monomeric compositions. The major monomers and their respective amounts are shown in Table I.

TABLE I

| Emulsion No. | Polymer Compositions Major Monomers (WT %) | Additional Monomers Present |
|---|---|---|
| 1 | 42 VA/38 DEHM/20E | — |
| 2 | 36 VA/44 DEHM/20E | — |
| 3 | 44 VA/36 DEHM/20E | 1% acrylic acid |
| 4 | 44 VA/36 DEHM/20E | 3% allyl carbamate |
| 5 | 44 VA/36 DEHM/20E | 1% monoethyl maleate |
| 6 | 44 VA/36 DEHM/20E | 1% acrylamide |
| 7 | 44 VA/36 DEHM/20E | 3% monoethyl maleate |
| 8 | 44 VA/36 DNOM/20E | — |
| 9 | 52 VA/28 DEHM/20E | — |
| 10 | 44 VA/36 DIOM/20E | — |
| 11 | 44 VA/36 DMAM/20E | — |

Monomer Key:
VA = Vinyl acetate
E = Ethylene
DEHM = Di-2-Ethylhexylmaleate
DNOM = Di-N—Octylmaleate
DIOM = Di-iso-Octylmaleate
DMAM = DI-Methylamylmaleate The emulsion characteristics of the preceding eleven emulsions are shown in Table II. The particle size (PS) is expressed in microns. The % grit represent the coagulum which did not pass through a 200 mesh screen.

TABLE II

| Emulsion No. | Solids % | Viscosity (cps) | pH | Grit % | PS | $T_g°$ |
|---|---|---|---|---|---|---|
| 1 | 56.8 | 560 | 3.0 | .015 | .30 | −32 |
| 2 | 52.1 | 65 | 3.3 | .013 | .23 | −32 |
| 3 | 50.6 | 70 | 3.0 | .004 | .23 | −29 |
| 4 | 54.4 | 185 | 3.5 | .015 | .22 | −29 |
| 5 | 53.1 | 60 | 3.4 | .016 | .35 | −29 |
| 6 | 53.6 | 65 | 3.1 | .018 | .30 | −29 |
| 7 | 53.2 | 85 | 2.8 | .054 | .27 | −29 |
| 8 | 49.5 | 90 | 3.8 | .009 | .22 | −31 |
| 9 | 53.9 | 120 | 3.9 | .015 | .30 | −26 |
| 10 | 53.2 | 1575 | 4.3 | .012 | .31 | −24 |
| 11 | 54.7 | 230 | 4.4 | .031 | .50 | −18 |

COMPARATIVE EXAMPLES

Emulsions A and B were prepared in accordance with the teachings of U.S. Pat. No. 4,322,516 to exemplify a high and a low ethylhexyl acrylate containing ethylene-vinyl acetate acrylate terpolymer. Thus, Emulsion A comprises a 50 vinyl acetate/15 ethylene/35 ethylhexyl acrylate terpolymer and Emulsion B a 30 vinyl acetate/15 ethylene/55 ethylhexyl acrylate terpolymer.

Emulsion C was made according to Example 1, (Emulsion 1), except that 1500 g of vinyl acetate and 1500 g di-2-ethylhexyl maleate were used and ethylene was not used in the polymerization procedure.

Emulsions D, E and F are examples of commercially available pressure sensitive water-borne adhesives used as paper label and tape adhesives, the Emulsions D and E being acrylic emulsions and F being tackified styrene-butadiene rubber (SBR).

The pressure sensitive adhesive emulsions prepared above were transfer coated to 2 mil polyester film at a dry adhesive deposition of 13–15 lbs. per ream (3000 sq. ft.) and were tested for peel, shear strength and tack using the methods outlined in the Pressure Sensitive Tape Council Manual entitled, "Test Methods for Pressure Sensitive Tapes, 5th Edition."

Peel Adhesion (180° Peel) is defined as the force requried to remove a pressure sensitive tape from a panel or its own backing at a specified angle and speed. The tape is applied to a standard test panel using determined definite pressure to make contact. The force is expressed in ounces per inch width of tape. The test is more fully described in the Manual of the Pressure Sensitive Tape Council, page 27, test PSTC-1.

Hold is a measure of shear adhesion or cohesive strength and is defined as the force necessary to remove the tape from a standard flat surface in a direction parallel to the surface to which it has been affixed under a predetermined definite pressure. Results are measured as time required to remove a standard tape area from a test panel using a standard load, or as distance displaced in a given time under a standard load. Values of at least one hour are preferred although shorter periods are sometimes acceptable if the adhesive strength is high. The test is more fully described in the Manual of the Pressure Sensitive Tape Council, page 40, test PSTC-7.

Loop Tack measures the tackiness of a pressure sensitive adhesive coating. It was tested using a TMI-TLMI Loop, Tack Testor Model #80-16. The force is expressed in ounces per square inch. Loop tack values below about 40 ounces are unacceptable.

TABLE III

PERFORMANCE TEST DATA

| Emulsion No. | Peel Adhesion (lbs) | | Polyester Adhesion Hold (hrs) 2 psi/180° | Loop Tack (oz) |
|---|---|---|---|---|
| | 20 mins | 24 hrs | | |
| 1 | 3.5 | 5.1 | 1.7 | 46 |
| 2 | 4.0 | 4.5 | 1.1 | 61 |
| 3 | 3.6 | 4.3 | 2.3 | 48 |
| 4 | 2.7 | 2.8 | 2.6 | 43 |
| 5 | 5.1 | 5.5 | 0.4 | 51 |
| 6 | 5.1 | 5.3 | 2.0 | 51 |
| 7 | 3.0 | 3.6 | 6.4 | 29 |
| 8 | 2.5 | 3.3 | 1.8 | 50 |
| 9 | 1.6 | 2.5 | 4.0 | 30 |
| 10 | 1.9 | 2.3 | 7.9 | 26 |
| 11 | 0.5 | 0.8 | 13.2 | 1 |
| Comp A | 0.8 | 1.5 | 24+ | 19 |
| Comp B | 1.5 | 2.0 | 9.1 | 21 |
| Comp C | 1.1 | 1.7 | 1.8 | 3 |
| Comp D | 2.3 | 3.1 | 2.2 | 42 |
| Comp E | 2.9 | 3.8 | 2.2 | 39 |
| Comp F | 2.3 | 2.4 | 6.3 | 51 |

The results presented in Table III show the adhesive properties obtained with the pressure sensitive adhesives of the present invention.

More particulary, the results presented above show that the desirable balance of adhesive and cohesive strength in the instant pressure sensitive adhesives is obtained only in a very narrow class of polymers. In this regard, Emulsion 1 and 2 show the useful range of major monomer components (compare, for example, with the results shown for Emulsion 9 containing a lower level of the dioctyl maleate wherein the adhesive properties are unacceptable).

Emulsions 3, 4, 5, 6 and 7 show the effect of small amounts of other monomers. Thus, in Emulsions 3, 5 and 6 the addition of 1% acrylic acid, acrylamide or monoethyl maleate give minor improvements in initial peel with cohesive strength (hold) and tack substantially unchanged. Emulsion 4 shows that the addition of higher levels of the allyl carbamate gives some decrease in the initial peel and tack while Emulsion 7 shows that this same level of monoethyl maleate, a more polar monomer, decreases these properties to the extent that the adhesive is barely acceptable. As was noted previously, the maximum level of such polar monomers tolerable in the adhesive copolymer will vary depending on the particular monomer.

Emulsions 1–6, 8 and 10 illustrate the suitability of di-2-ethylhexyl maleate and di-n-octyl maleate as opposed to di-iso-octyl maleate isomer in the preparation of the adhesives of the present invention. Similarly, Emulsion 11 shows the unsuitability of the di-methylamyl maleate, a $C_6$ maleate which does not impart sufficient pressure sensitivity to the system.

Comparative Emulsions A and B show that the compositions of the '516 patent, while providing adequate cohesive strength are unacceptably low in adhesive strength as measured by their peel adhesion and loop tack values.

Comparative Emulsion C shows a typical vinyl acetate-dioctyl maleate copolymer made by techniques of Emulsion 1, but omitting ethylene from system. This shows that even with high di-octylmaleate content (50%), this polymer has low peel and low loop tack and that ethylene incorporation is a necessity to achieve the excellent peel/tack of these products.

Comparative Emulsions C, D and E show that typical acrylic products previously used for this application have generally lower peel and lower tack than the preferred compositions of the present invention (compare, for example, with Emulsion 2), while the tackified SBR rubbers (Emulsion F), although having the tack of the present adhesive polymers, have generally lower initial peel strength.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed is:

1. A pressure sensitive adhesive composition comprising a polymer prepared by an emulsion polymerization procedure, said polymer consisting essentially of 35–50% by weight of a vinyl ester of an alkanoic acid, 15–30% by weight ethylene, 35–50% by weight of di-2-ethylhexyl maleate or a corresponding fumarate and 0–3% of a copolymerizable comonomer selected from the group consisting of monoethyl maleate, acrylamide, acrylic acid, allyl carbamate, N-methylol (meth)-acrylamide, N-vinylpyrrolidinone, diallyl adipate, triallyl cyanurate, butanediol diacrylate, allyl methacrylate, and hydroxyalkyl acrylate.

2. The pressure sensitive adhesive of claim 1 wherein the di-2-ethylhexyl maleate or corresponding fumarate is present in an amount of 35 to 40% by weight.

3. The pressure sensitive adhesive of claim 1 wherein the copolymerizable comonomer is selected from the group consisting of monoethyl maleate, acrylamide, acrylic acid and allyl carbamate and wherein the copolymer has a Tg within the range of $-35°$ to $-25°$ C.

* * * * *